United States Patent [19]
Adams et al.

[11] 4,402,389
[45] Sep. 6, 1983

[54] PRESS BRAKE SAFETY DEVICE

[75] Inventors: Richard P. Adams, Dewey Rose; Charles Christian, Jasper, both of Ga.

[73] Assignee: Royston Manufacturing Corporation, Royston, Ga.

[21] Appl. No.: 237,972

[22] Filed: Feb. 25, 1981

[51] Int. Cl.³ .............................................. F16P 3/14
[52] U.S. Cl. .................................... 192/134; 100/53; 192/129 B; 403/31
[58] Field of Search ..................... 192/133, 134, 129 B; 100/53; 403/31

[56] References Cited

U.S. PATENT DOCUMENTS

| | | | |
|---|---|---|---|
| 1,169,684 | 1/1916 | Sheff ................................. | 192/134 |
| 4,060,160 | 11/1977 | Lieber ............................... | 100/53 X |
| 4,119,118 | 10/1978 | Patel ................................. | 403/31 X |
| 4,131,189 | 12/1978 | Stephens .......................... | 192/134 X |

FOREIGN PATENT DOCUMENTS 1599418 9/1981 United Kingdom ................ 192/134

OTHER PUBLICATIONS

Data Instruments Inc., "Light Curtain of the 80's", Booklet, p. 5, Feb. 1981.

*Primary Examiner*—Allan D. Herrmann
*Attorney, Agent, or Firm*—Howson and Howson

[57] ABSTRACT

In a mechanical press brake, a photoelectric sensor causes extension of an air cylinder in the linkage between the operating pedal and the clutch lever, thereby disabling the pedal whenever the operator's hand or arm is in dangerous proximity to the machine's ram. The piston of the air cylinder is connected to the pedal through a lost-motion, and the pedal is continuously urged toward its rest position by a spring. The lost-motion and spring prevent repeated extension and retraction of the cylinder from causing dangerous and annoying operation of the pedal during preparation for a forming operation.

12 Claims, 3 Drawing Figures

PRESS BRAKE SAFETY DEVICE

BRIEF SUMMARY OF THE INVENTION

This invention relates to an improved safety device for use on mechanical press brakes.

There are two basic types of press brakes presently in use in the sheet metal fabrication industry. The older type of press brake is the mechanical press brake in which a ram is actuated to move toward a bed by a crankshaft which is connectable to a rotating flywheel through a clutch. The clutch is connected to a foot-operable pedal through a mechanical linkage. The clutch is associated with a crankshaft brake which automatically stops crankshaft rotation when the clutch is disengaged. The other basic type of press brake is the electric-pneumatic brake, in which the ram is moved by fluid pressure, and the flow of fluid is controlled by electrically operated valves.

Many press brake operators prefer the mechanical press brake over the electric-pneumatic brake because the mechanical press brake has certain desirable operating characteristics not available with the electric-pneumatic brake. The mechanical brake tends to be smoother in operation, and capable of producing formed parts of better quality at higher production rates. Many operators prefer the mechanical press brake because they are able to feel the operation of the clutch through the pedal, and as a result are able to achieve better control over the machine.

All press brakes have an inherent safety problem in that it is easy for the operator to have his hand or arm in dangerous proximity to the ram when the ram is actuated. This inherent safety problem is well recognized and is now the subject of Federal regulation.

Various mechanical barrier guards are in use, as are photoelectric safety devices which deactivate the machine when a photoelectric device senses the presence of an operator's hand or arm in dangerous proximity to the ram.

With photoelectric sensing, deactivation of an electric-pneumatic press brake is easily accomplished. The photoelectric sensing device operates a relay which breaks the electrical circuit to the electrically operated fluid valves.

With the mechanical press brake, because of the direct mechanical linkage between the pedal and the clutch, it is necessary to use mechanical means to prevent the clutch from engaging when the photoelectric sensing means senses a dangerous condition. To this end, air cylinders have been used to lengthen a bar in the linkage between the operating pedal and the clutch when a dangerous condition is sensed photoelectrically. Lengthening of the linkage causes the operating pedal to move to the floor or to a stop beyond which it cannot be moved. As a result, the operator cannot actuate the clutch when his hands or arms are in dangerous proximity to the ram.

The photoelectrically operated air cylinder, as used in the past, has adequately eliminated the danger to the operator's hands and arms. However, the operation of the air cylinder causes the pedal to move violently downward whenever the light beam between the light source and the sensing device is broken. This movement of the pedal can injure the operator by impact with his ankle, instep or toes if his foot happens to be underneath the pedal at the time the sensing device is activated. Consequently, the air cylinder safety device, while providing a solution to one safety problem, gives rise to another entirely new problem which, though less series, is still a substantial one. Furthermore, even if the operator's foot is not exposed to impact from the pedal, each time the operator breaks the light beam in the course of setting up the work, he causes the pedal to fall to the floor. Each time the obstacle is removed from the light beam, the pedal jumps back up to its rest position. These movements of the pedal occur repeatedly and are very annoying to the operator.

One possible solution to the problem of undesired pedal movement is to disable the safety device when the press brake is at rest and enable it only after the ram has begun its descent. This solution, however, is not entirely satisfactory because it allows ram movement to be initiated when the operator's hands are in proximity to the ram. If the crankshaft brake fails under these conditions, injury could result.

The principal object of this invention is to provide a safety device for use with a mechanical press brake, which substantially eliminates the hazard to the operator's hands and arms, and at the same time eliminates the hazard to the operator's feet as well as the annoying repeated movement of the pedal whenever the photoelectric light beam is broken and reestablished.

It is also an object of the invention to provide a press brake safety device which does not interfere with the desirable operating characteristics of a mechanical press brake.

Finally, it is an object of the invention to achieve each of the foregoing objects reliably and inexpensively, using an extremely simple apparatus.

The mechanical press brake in accordance with the invention comprises a bed, a ram cooperable with the bed, means operable to effect movement of the ram toward the bed to effect a forming operation, a foot-operable pedal movable from a rest position to an operating position, linkage means, connected between the pedal and the means operable to effect movement of the ram, for effecting movement of the ram toward the bed upon movement of the pedal to its operating position, sensing means associated with the bed for sensing the presence of the operator's hands and arms in dangerous proximity to the ram, and means operatively connected to and responsive to the sensing means for disabling the linkage means when the sensing means senses the presence of an operator's hand or arm in dangerous proximity to the ram at least within a preestablished range of ram positions.

The invention is characterized by means, such as a spring, connected to the pedal and arranged to urge the pedal toward its rest position, and by disconnect means, preferably in the form of a lost-motion mechanism, constituting part of the linkage and movable between a first position in which movement of the pedal effects movement of the ram toward the bed and a second position in which movement of the pedal does not effect movement of the ram.

It is further characterized by an actuator, preferably in the form of a pneumatic cylinder with a return spring. The actuator constitutes part of the linkage means, and is responsive to the sensing means. It is operatively connected to the disconnect means and serves to move the disconnect means to its second position when the sensing means senses the presence of the operator's hand or arm in dangerous proximity to the ram. The operative connection between the pedal and the means operable to effect movement of the ram is disabled without movement of the pedal whenever the operator's hand or arm is in dangerous proximity to the ram.

The invention is described below with reference to a mechanical press brake of the flywheel, clutch, crankshaft type. However, the term "mechanical press brake" as used herein should be understood as inclusive of any alternative press brake having a direct mechanical direction between an operating pedal and a ram actuating means.

Various objects and advantages of the invention other than those specifically set forth above will be apparent from the following detailed description when read in conjunction with the drawings.

DETAILED DESCRIPTION

Figure 1:
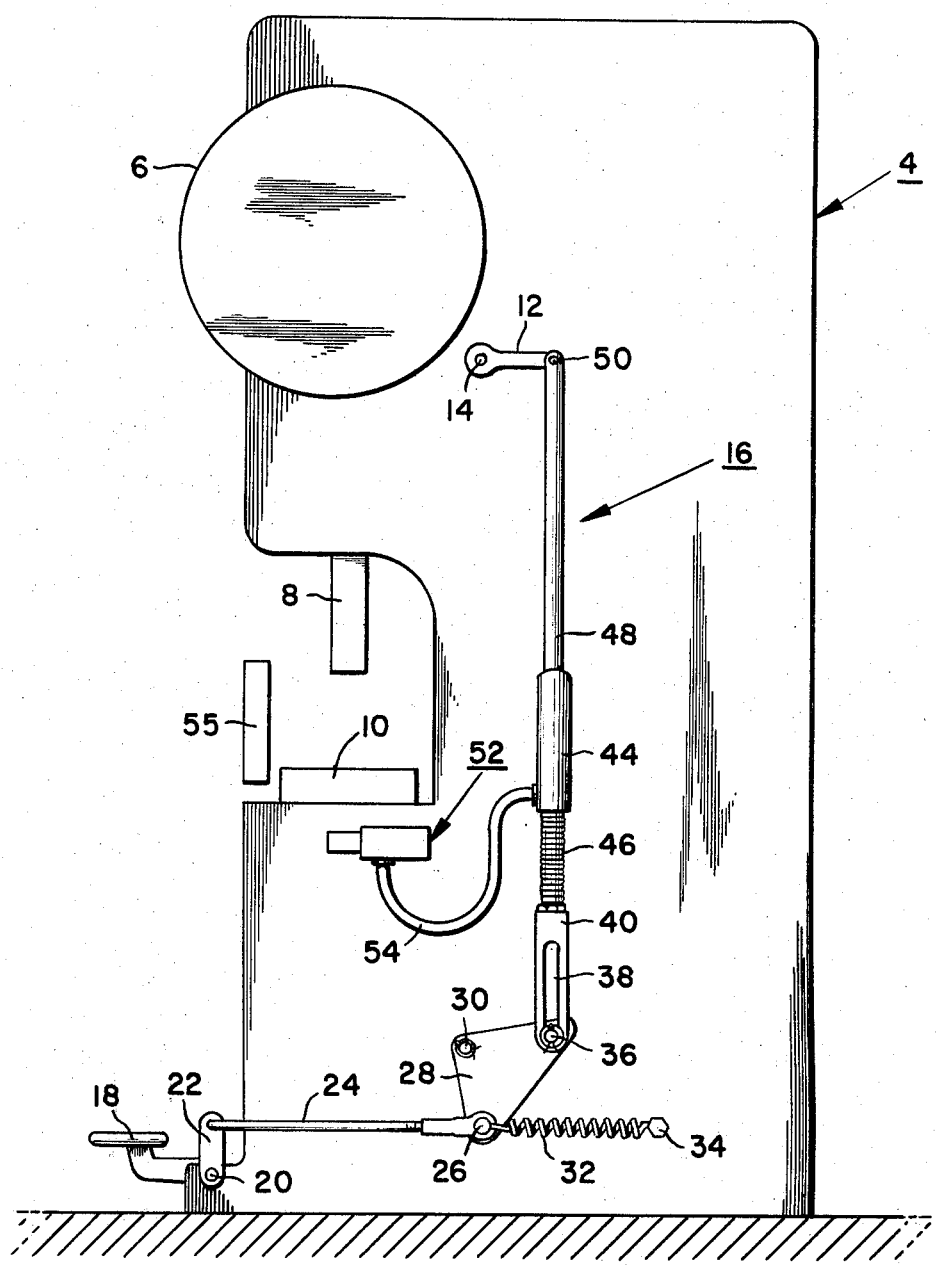
FIG. 1 is a diagrammatic side elevation of a mechanical press brake showing the location of the photoelectric sensing apparatus, and illustrating the linkage between the operating pedal and the clutch lever.

FIG. 1 shows a mechanical press brake 4 of the type having a rotating flywheel, a clutch, and a cam-operated ram connectable to the flywheel through the clutch. The clutch is associated with an automatic brake (not shown) which rapidly stops rotation of the crankshaft when the clutch is disengaged. The clutch housing is indicated at 6. Ram 8 is movable toward a fixed bed 10 on the press brake. The ram and bed carry suitable dies (not shown) for forming the work.

The clutch is engaged and disengaged by a clutch operating lever 12 which is secured to a clutch operating shaft 14 which serves as a pivot for lever 12. Clutch lever 12 is mechanically connected through a linkage generally designated 16, to a foot pedal 18. Pedal 18 is secured to a shaft 20 which extends across the face of the machine. Desirably, the foot pedal is slidable along shaft 20 so that it can be secured thereon at any position desired by the press brake operator. An arm 22 is fixed to shaft 20, and is connected through horizontal bar 24 to pin 26 of a bell crank 28. Bell crank 28, also known as a "pivot plate", is pivoted on pin 30.

Figure 2:
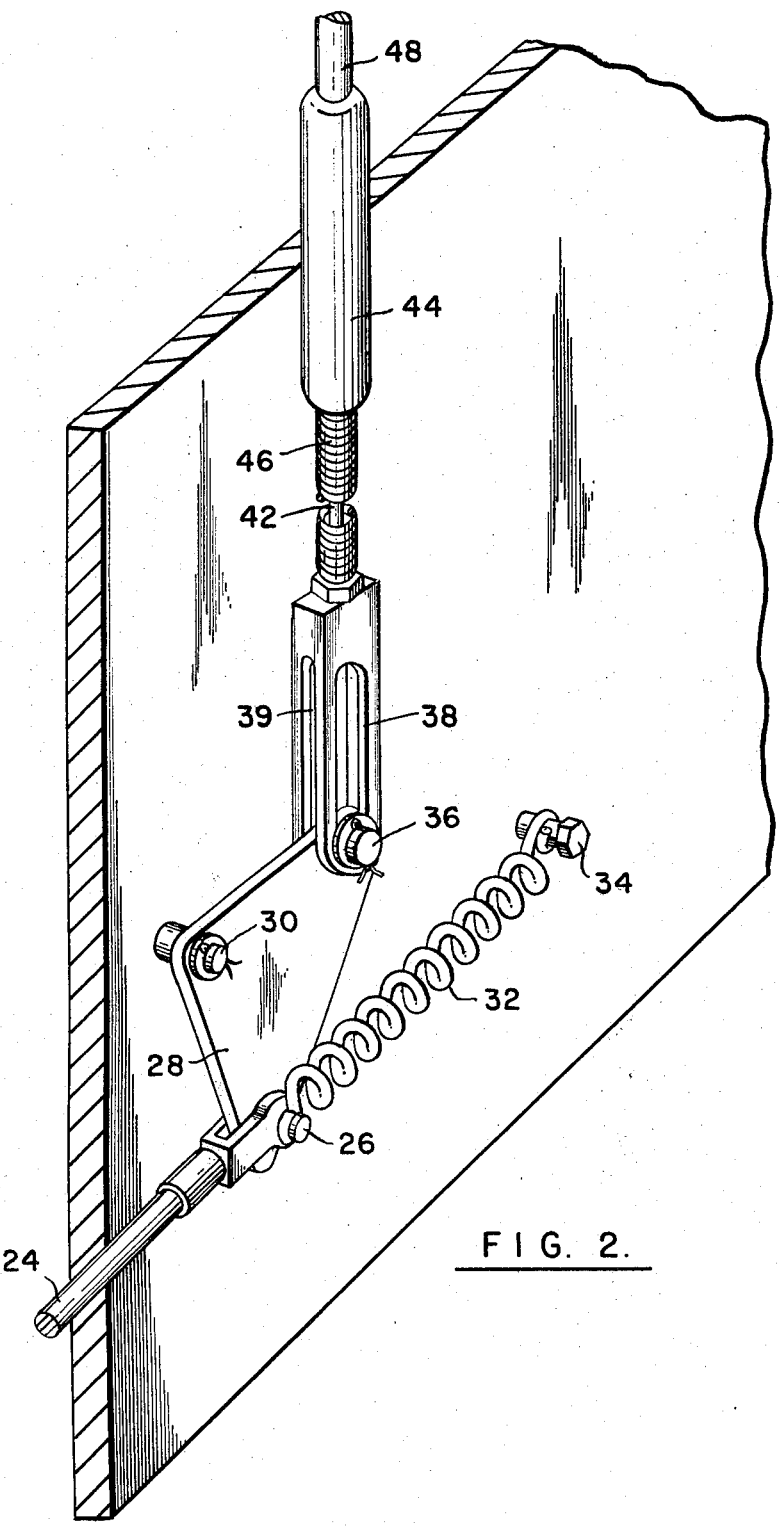
FIG. 2 is an oblique perspective view showing the details of the pneumatic cylinder and the lost-motion mechanism used in the preferred embodiment of the invention.

For a detailed showing of the bell crank assembly, reference should be made to FIG. 2. A coiled tension spring 32 is connected between pin 26 on the bell crank and a pin 34 fixed to the press brake housing. Spring 32 exerts a force on bar 24 which urges the pedal upwardly toward its rest position, as shown in FIG. 1.

A pin 36 on bell crank 28 extends through vertically elongated slots 38 and 39 (FIG. 2) on a female clevis 40 which embraces bell crank 28. The clevis can slide vertically with respect to pin 36. The lower ends of slots 38 and 39 are closed in order to establish a limit in the relative movement between the pin 36 and clevis 40. When the foot pedal is depressed, bar 24 moves to the left, and causes clockwise rotation of bell crank 28. Pin 36 on the bell crank engages the closed lower end of slots 38 and 39 on the clevis, and the clevis moves downwardly.

As shown in FIG. 2, the upper end of clevis 40 is fixed to piston rod 42 of pneumatic cylinder 44. A coil spring 46 is in compression between the bottom of cylinder 44 and the upper end of clevis 40. The piston within cylinder 44 is near the top of the cylinder, and is held in that position against the urging of spring 46 by the pressure of air within the cylinder.

As shown in FIG. 1, the upper end of the cylinder is connected through bar 48 to pin 50 on the end of clutch lever 12 opposite clutch operating rod 14.

So long as air pressure is maintained within the cylinder, depression of operating pedal 18 causes clockwise rotation of bell crank 28. This in turn causes clockwise rotation of clutch lever 12 for engagement of the clutch. Engagement of the clutch actuates the ram, causing it to move toward bed 10 for a forming operation.

As shown in FIG. 1, air is received into cylinder 44 near the lower end of the cylinder from a solenoid-operated valve 52 through a flexible air line 54.

The presence of the operator's hand or arm in dangerous proximity to the ram is sensed photoelectrically by a vertically elongated light source adjacent one end of the ram, and a vertically elongated photocell array adjacent the other end of the ram. The light source and photocell array may be collectively referred to as "photoelectric sensing means" and are indicated by reference numeral 55 in FIG. 1. The light source and photocell array are supported on the machine in fixed relationship to bed 10 and are located so that the light beam is between the operator's position and the gap between the ram and the bed.

Figure 3:
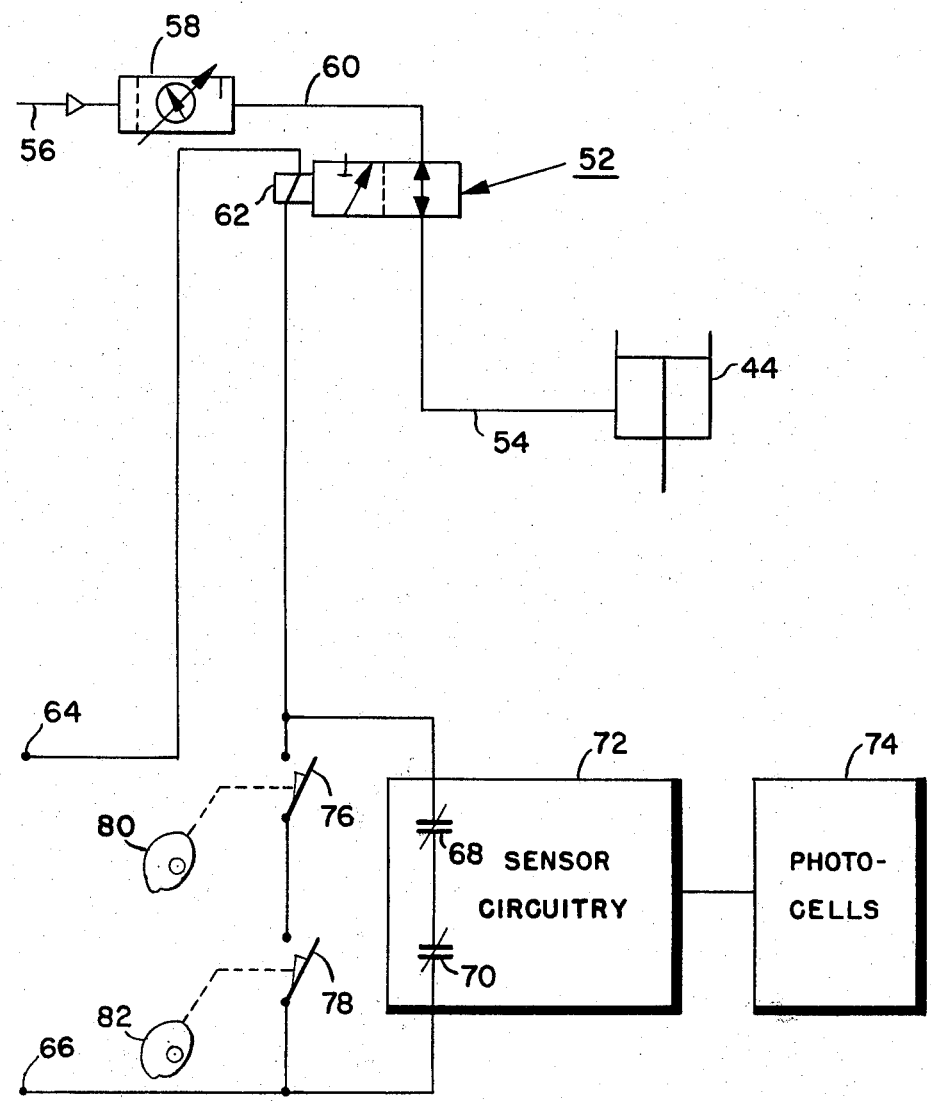
FIG. 3 is a schematic diagram of the pneumatic and electrical apparatus associated with the photoelectric sensing means and the pneumatic cylinder.

FIG. 3 shows a compressed air supply line 56 connected to the inlet end of an air line filter, regulator and lubricator 58. The outlet end of device 58 is connected through air line 60 to solenoid-operated valve 52, which is shown in the solenoid-energized position. In this position, line 60 is in communication with the interior of air cylinder 44 through flexible air line 54. When solenoid 62 of valve 52 is deenergized, air line 60 is blocked, and air is bled from cylinder 44 through line 54 and valve 52.

Solenoid 62 is energized from electrical supply terminals 64 and 66 through relay contacts 68 and 70 of conventional photoelectrically activated sensor circuitry 72, operating in conjunction with photocell array 74 which forms part of photoelectric sensing means 55 (FIG. 1). The sensor circuitry is connected so that contacts 68 and 70 remain closed so long as the light beam impinges on all the photocells. If the light beam is broken, contacts 68 and 70 open. Two sets of contacts, connected in series, are used in sensor circuitry 72 for redundancy so that if one set of contacts fails in the closed position, the other will break the solenoid-energizing circuit.

Connected in parallel with the series combination of sensor contacts 68 and 70 is a pair of cam-operated switches 76 and 78, which are respectively operated by cams 80 and 82. These switch-operating cams are mechanically connected to the crankshaft of the press brake. They are contoured so that switches 76 and 78 are held open when the ram is at rest (i.e. when the ram-operating crankshaft is at top dead center). Cams 80 and 82 close switches 76 and 78 when the ram reaches a point at which the die opening is ¼ inch or less. This occurs at approximately 160° of rotation of the ram-operating crankshaft. These switches remain closed through the remainder of the cycle of the crankshaft until the ram approaches its rest position at top dead center, whereupon switches 76 and 78 again reopen.

The purpose of switches 76 and 78 is to disable the sensor circuitry thereby preventing extension of the air cylinder during the portion of the machine cycle which begins when the die opening reaches a ¼ inch and ends when the ram returns to its rest position. This prevents the photoelectric sensing circuitry from disengaging the clutch and braking the machine when the light beam is broken by sheet metal during the forming operation. It also improves production by allowing the operator to reach in and remove the work immediately after the forming operation while the ram is moving upwardly toward its rest position. Switches 76 and 78 are open, and the safety apparatus is enabled when the ram is at rest, and during the descent of the ram until it reaches a position such that the die opening is ¼ inch or less. Switches 76 and 78 are connected in series for redundancy.

In the operation of the apparatus described above, when the ram is at rest, or during its descent, the photoelectric sensing circuitry deenergizes valve solenoid 62 whenever the light beam is broken. When the solenoid is deenergized, valve 52 immediately provides a bleed path for air from cylinder 44. Coil spring 46 extends piston rod 42 of cylinder 44, and causes clevis 40 to move downwardly with respect to bell crank pin 36. The clevis and bell crank pin 36 serve as a "lost-motion" mechanism. So long as the clevis is held down by extension of the piston rod, depression of the pedal has no effect on the clutch-operating lever. It merely causes pin 36 to slide downwardly within clevis slots 38 and 39.

Assuming that the pedal is not depressed when the light beam is broken, breaking of the light beam merely causes extension of the piston rod, and downward movement of the clevis, without movement of the pedal. The pedal remains in its rest position by virtue of the action of coil spring 32.

When the light beam is reestablished, solenoid 62 is energized, and valve 52 delivers air to cylinder 44 causing the piston to retract. This occurs automatically without any effect on pedal 18. The press brake is made operable immediately without the need for the operator to perform any further steps.

The invention substantially elminates the possibility of injury to the operator by the ram, and at the same time eliminates the danger and annoyance caused by undesired movement of the pedal upon breaking the light beam. It achieves these results reliably and inexpensively, and without interfering with desirable operating characteristics of the mechanical press brake. The lost-motion mechanism, and the slotted clevis in particular, contribute to the simplicity and reliability of the invention.

While one specific form of the invention has been described, the apparatus can take various alternative forms. For example, the cylinder, and valving can be arranged so that extension of the linkage takes place as a result of the flow of air into the cylinder, and the cylinder is retracted by a spring. It is of course possible to eliminate the bell crank by using suitable linkages between the pedal and the cylinder. It is also possible, through the use of suitable levers, to disable the pedal by cylinder retraction instead of by cylinder extension. Other sensing means, such as ultrasonic sensing means, can be used instead of the photoelectric sensing means described above.

Various other modifications can be made without departing from the scope of the invention as described in the following claims.

We claim:

1. In a mechanical press brake having a bed, a ram cooperable with the bed, ram control means operable to effect movement of the ram toward the bed to effect a forming operation, a foot-operable pedal movable from a rest position to an operating position, linkage means, connected between the pedal and the ram control means, for effecting movement of the ram toward the bed upon movement of the pedal to its operating position, and sensing means associated with the bed for sensing the presence of the operator's hands and arms in dangerous proximity to the ram, the improvement comprising means operatively connected to and responsive to the sensing means for disabling the linkage means when the sensing means senses the presence of an operator's hand or arm in dangerous proximity to the ram at least within a preestablished range of ram positions, and the improvement being characterized by:

means connected to the pedal and arranged to urge the pedal toward its rest position;

lost motion means constituting part of the linkage and normally transmitting motion from the pedal to the ram control means, said lost motion means being movable between a first position in which movement of the pedal effects movement of the ram toward the bed and a second position in which movement of the pedal does not effect movement of the ram; and an actuator operatively connected to the lost motion means and responsive to the sensing means for moving the lost motion means from its first position to its second position whenever the sensing means senses the presence of an operator's hand or arm in dangerous proximity to the ram;

whereby the operative connection between the pedal and the ram control means is disabled without movement of the pedal whenever the operator's hand or arm is in dangerous proximity to the ram.

2. A mechanical press brake according to claim 1 in which the means connected to the pedal and arranged to urge the pedal toward its rest position is a spring.

3. A mechanical press brake according to claim 1 in which the actuator comprises a pneumatic cylinder having a piston within the cylinder and arranged to be urged in a first direction by air pressure within the cylinder, and spring means acting between the piston and the pneumatic cylinder for urging the piston in a second direction with respect to the cylinder opposite to said first direction.

4. A mechanical press brake according to claim 1 in which the actuator comprises a pneumatic cylinder having a piston within the cylinder and arranged to be urged in a first direction by air pressure within the cylinder, and spring means acting between the piston and the pneumatic cylinder for urging the piston in a second direction with respect to the cylinder opposite to said first direction, and in which the lost motion means is movable to its second position by movement of the piston in said second direction under the action of the spring means.

5. A mechanical press brake according to claim 1 in which the lost motion means comprises a pivoted plate constituting part of the linkage, the plate having a pin extending outwardly from both faces of the plate at a location remote from the pivot of the plate, and a clevis embracing the plate and having elongated slots on opposite sides of the plate receiving the respective ends of the pin, the slots being closed at least at one end whereby motion can be transmitted between the clevis and the plate.

6. A mechanical press brake according to claim 1 in which the actuator includes means for automatically returning the lost motion means to its first position when the sensing means does not sense the presence of any object in dangerous proximity to the ram.

7. In a mechanical press brake having a bed, a ram cooperable with the bed, a flywheel, and clutch means, connected between said flywheel and said ram and operable to effect movement of the ram toward the bed to effect a forming operation, clutch-actuating means movable to effect engagement and disengagement of the clutch means, a foot-operable pedal movable from a rest position to an operating position, linkage means, connected between the pedal and the clutch-actuating means for effecting operating movement of the clutch-actuating means upon movement of the pedal to its operating position, and sensing means associated with the bed for sensing the presence of the operator's hands and arms in dangerous proximity to the ram, the improvement comprising means operatively connected to and responsive to the sensing means for disabling the linkage means when the sensing means senses the presence of an operator's hand or arm in dangerous proximity to the ram at least within a preestablished range of ram positions, and the improvement being characterized by:

means connected to the pedal and arranged to urge the pedal toward its rest position, lost motion means constituting part of the linkage and normally transmitting motion from the pedal to the clutch actuating means, said lost motion means being movable between a first position in which movement of the pedal effects engagement of the clutch means and a second position in which movement of the pedal does not effect engagement of the clutch means; and an actuator operatively connected to the lost motion means and responsive to the sensing means for moving the lost motion means from its first position to its second position whenever the sensing means senses the presence of an operator's hand or arm in dangerous proximity to the ram;

whereby the operative connection between the clutch means and the pedal is disabled without movement of the pedal whenever the operator's hand or arm is in dangerous proximity to the ram.

8. A mechanical press brake according to claim 7 in which the means connected to the pedal and arranged to urge the pedal toward its rest position is a spring.

9. A mechanical press brake according to claim 7 in which the actuator comprises a pneumatic cylinder having a piston within the cylinder and arranged to be urged in a first direction by air pressure within the cylinder, and spring means acting between the piston and the pneumatic cylinder for urging the piston and in a second direction with respect to the cylinder opposite to said first direction.

10. A mechanical press brake according to claim 7 in which the actuator comprises a pneumatic cylinder having a piston within the cylinder and arranged to be urged in a first direction by air pressure within the cylinder, and spring means acting between the piston and the pneumatic cylinder for urging the piston in a second direction with respect to the cylinder opposite to said first direction, and in which the lost motion means is movable to its second position by movement of the piston in said second direction under the action of the spring means.

11. A mechanical press brake according to claim 7 in which the lost motion means comprises a pivoted plate constituting part of the linkage, the plate having a pin extending outwardly from both faces of the plate at a location remote from the pivot of the plate, and a clevis embracing the plate and having elongated slots on opposite sides of the plate receiving the respective ends of the pin, the slots being closed at least at one end whereby motion can be transmitted between the clevis and the plate.

12. A mechanical press brake according to claim 7 in which the actuator includes means for automatically returning the lost motion means to its first position when the sensing means does not sense the presence of any object in dangerous proximity to the ram.

* * * * *